United States Patent
Annampedu et al.

(10) Patent No.: US 7,502,187 B2
(45) Date of Patent: Mar. 10, 2009

(54) ADDRESS MARK DETECTION

(75) Inventors: Viswanath Annampedu, Schnecksville, PA (US); Fatih Sarigoz, Bethlehem, PA (US)

(73) Assignee: Agere Systems Inc., Allentown, PA (US)

(*) Notice: Subject to any disclaimer, the term of this patent is extended or adjusted under 35 U.S.C. 154(b) by 789 days.

(21) Appl. No.: 10/900,547

(22) Filed: Jul. 28, 2004

(65) Prior Publication Data

US 2006/0023603 A1 Feb. 2, 2006

(51) Int. Cl.
G11B 5/09 (2006.01)
(52) U.S. Cl. .............................. 360/53; 360/48; 360/51; 360/78.14
(58) Field of Classification Search ........................ None
See application file for complete search history.

(56) References Cited

U.S. PATENT DOCUMENTS

| | | | | |
|---|---|---|---|---|
| 4,271,519 A | * | 6/1981 | Hall | 714/771 |
| 5,341,479 A | * | 8/1994 | Dean et al. | 711/4 |
| 5,586,306 A | * | 12/1996 | Romano et al. | 711/112 |
| 5,661,708 A | * | 8/1997 | Yamawaki | 369/47.22 |
| 5,856,986 A | * | 1/1999 | Sobey | 714/744 |
| 5,982,308 A | * | 11/1999 | Bang | 341/96 |
| 6,014,276 A | * | 1/2000 | Takase | 360/49 |
| 6,021,012 A | * | 2/2000 | Bang | 360/51 |
| 6,201,652 B1 | * | 3/2001 | Rezzi et al. | 360/40 |
| 6,452,990 B1 | * | 9/2002 | Leis et al. | 375/361 |
| 6,639,748 B1 | * | 10/2003 | Christiansen et al. | 360/66 |
| 7,002,767 B2 | * | 2/2006 | Annampedu et al. | 360/75 |
| 7,054,398 B1 | * | 5/2006 | Wu et al. | 375/354 |
| 7,092,177 B2 | * | 8/2006 | Ehrlich | 360/29 |
| 2002/0114100 A1 | * | 8/2002 | Reed et al. | 360/77.07 |
| 2003/0058562 A1 | * | 3/2003 | Kuki et al. | 360/51 |
| 2003/0095350 A1 | * | 5/2003 | Annampedu et al. | 360/39 |

* cited by examiner

Primary Examiner—Hoa T Nguyen
Assistant Examiner—Dismery E Mercedes
(74) Attorney, Agent, or Firm—Mendelsohn & Assoc., P.C.; Kevin M. Drucker; Steve Mendelsohn

(57) ABSTRACT

A recording system, such as a magnetic or optical recording system, employs an address mark (AM) detector that searches for an address mark pattern that is augmented by one or more bits of a preamble field so that a false detection rate is reduced. In one case, the address mark includes L bits, and the AM detector compares i) the input detected bits with ii) a SAM pattern of L bits augmented with m bits of the preamble to detect the SAM. In another case, the address mark includes less than L bits (e.g., L–k bits), and the AM detector compares i) the input detected bits with ii) a SAM bit-pattern of (L–k) bits augmented with m bits of the preamble to detect the SAM.

24 Claims, 2 Drawing Sheets

ADDRESS MARK DETECTION

BACKGROUND OF THE INVENTION

1. Field of the Invention

The present invention relates to data transfer through a communication system channel, and, more particularly, to detection of data information from a recording medium.

2. Description of the Related Art

A read channel component is an integrated circuit (IC) of a computer hard disk (HD) drive that encodes, detects, and decodes data, enabling a read/write head to correctly i) write data to the disk drive and ii) read back the data. The disks in an HD drive have a number of tracks, each track consisting of i) user (or "read") data sectors and ii) control (or "servo") data sectors embedded between the read sectors. Information of the servo sectors is employed to position the head (e.g., a magnetic recording/playback head) over a track so that the information stored in the read sector can be retrieved properly.

A servo sector typically comprises a servo preamble, an encoded servo address mark (SAM), encoded Gray data, a burst demodulation (demod) field, and a repeatable run-out (RRO) field. The servo preamble allows for timing recovery and gain adjustment of the written servo data. The SAM is an identifier of fixed bit-length that identifies the beginning of the servo data, with the value for this identifier being the same for all servo sectors. For some prior art systems, a 9-bit SAM is written (after encoding) between the servo preamble field and the servo Gray data.

Gray data represents the track number/cylinder information and provides coarse positioning information for the head. The burst demod field provides fine positioning information for the head. RRO field data provides head positioning information that is i) finer than that provided by Gray data and ii) coarser than that provided by the burst demodulation fields. Specifically, RRO field data is typically employed for compensation when the head does not follow a circular track around the disk. The read sector comprises a read preamble, a read address mark (RAM), and encoded user data. The read preamble also provides for timing recovery and gain adjustment, and the RAM identifies the read sector user data.

Servo information is encoded by one or more encoders, each encoder converting M input bits (an input data block) into N output symbols (an output codeword). The encoded servo information is written to the disk and read back by a magnetic recording head. When the head of a recording system reads data from a sector of an HD, the data is provided as an analog signal (readback signal) that is subsequently level-adjusted, equalized, and sampled for further digital signal processing to detect and decode the servo information.

The readback data is equalized to a desired target partial response by an equalizer configured as a continuous time filter (CTF) followed by a discrete-time finite impulse response (FIR) filter. The sampling of the CTF output signal uses timing information generated by a digital phase-locked loop (DPLL) locked to the symbol rate (T). The output samples of the equalizer are quantized to digital sample values ('Y' values) using an A/D converter (ADC). The 'Y' values are applied to a data detector (e.g., threshold detector or Viterbi detector). A SAM detector then searches for the SAM bit pattern in the detected data. Once SAM is detected, the Gray code decoder decodes the data following the SAM data as Gray data. The RRO data detector and burst demodulator also employ these 'Y' values.

Since servo Gray data can be successfully recovered only after the SAM is detected, accurate detection of the SAM is relatively important. Consequently, reducing the SAM miss rate (rate of failed SAM detection) and the false SAM rate (rate of incorrect SAM detection) is desirable. Although low SAM miss rate and false SAM rate are important, better performance results for higher SAM miss rate than for higher false SAM rate.

As a higher number of bits are examined for SAM detection, the false SAM rate decreases, but the SAM miss rate increases. Similarly, as a lower number of bits are examined, the false rate increases, but the SAM miss rate decreases. Consequently, for a certain number of bits (L) for SAM detection, a given design attempts to improve the false SAM rate without an increase in format overhead (i.e., without increasing L).

For an L-bit wide SAM encoded with a wide biphase code, $[s(1)\ s(2)\ s(3)\ldots s(L)]$ denotes the L-bit pattern used for the SAM, where $s(.)$ is either a "0" or a "1". A wide biphase code encodes, for example, a "0" to "1100" and a "1" to "0011". Typically, a threshold detector is employed to detect wide biphase-encoded information. The readback signal exhibits either a positive peak or a negative peak at the codeword boundary (every 4T, for the above example encoding) after equalization to a target partial response. Thus, by having a threshold of zero at the codeword boundary, if the received sample is greater than the threshold, then the data bit is detected and decoded as a "1"; otherwise, the data bit is detected and decoded as a "0".

A prior art SAM detector for detecting an L-bit SAM operates as illustrated in FIG. 1. Every 4T (at the codeword boundary), the detected bit (1 or 0) is shifted into L-bit shift register 101 (which is initialized to L 1's before detection begins). Detected bits are denoted by $d(.)$ in FIG. 1. The L bits in shift register 101 are then compared by L-bit comparator 103 with a copy of the L-bit pattern used for the SAM $[s(1)\ s(2)\ldots s(L)]$ that is stored in register 102. If the bit patterns of shift register 101 and register 102 match, then SAM detection is declared. Otherwise, the detection and shifting process continues until the SAM is found.

SUMMARY OF THE INVENTION

In accordance with one embodiment of the present invention, the presence of field data is detected in a readback signal. The presence is detected by: (i) detecting N bits from the readback signal, N an integer; ii) comparing the N detected bits with a predefined pattern, wherein the predefined pattern comprises the field data augmented by one or more bits of a preamble adjacent to the field data; and iii) declaring, when the N bits match the predefined pattern, the field data to be present.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
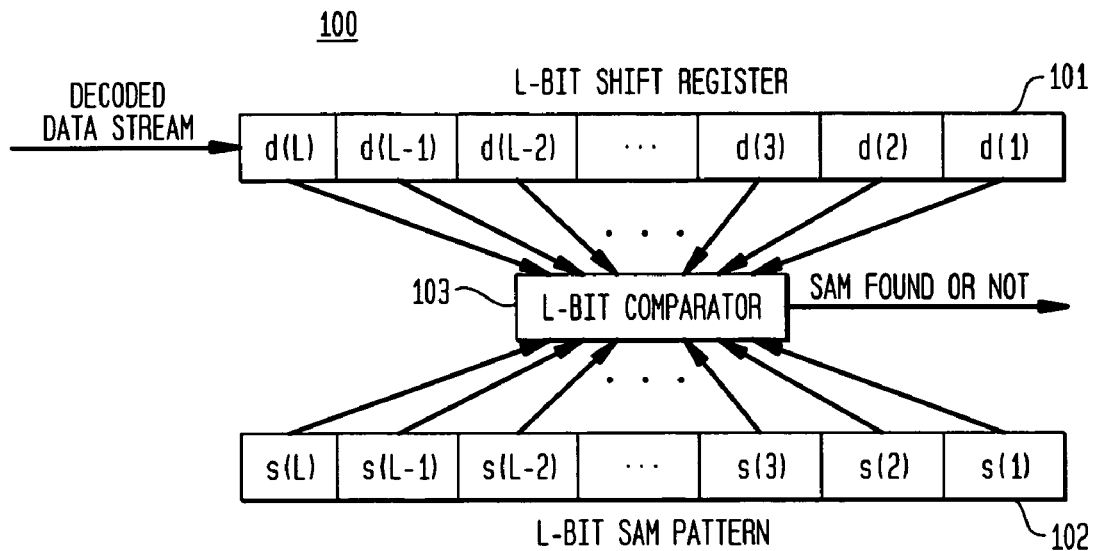
FIG. 1 shows a servo address mark (SAM) detector of the prior art.
Figure 2:
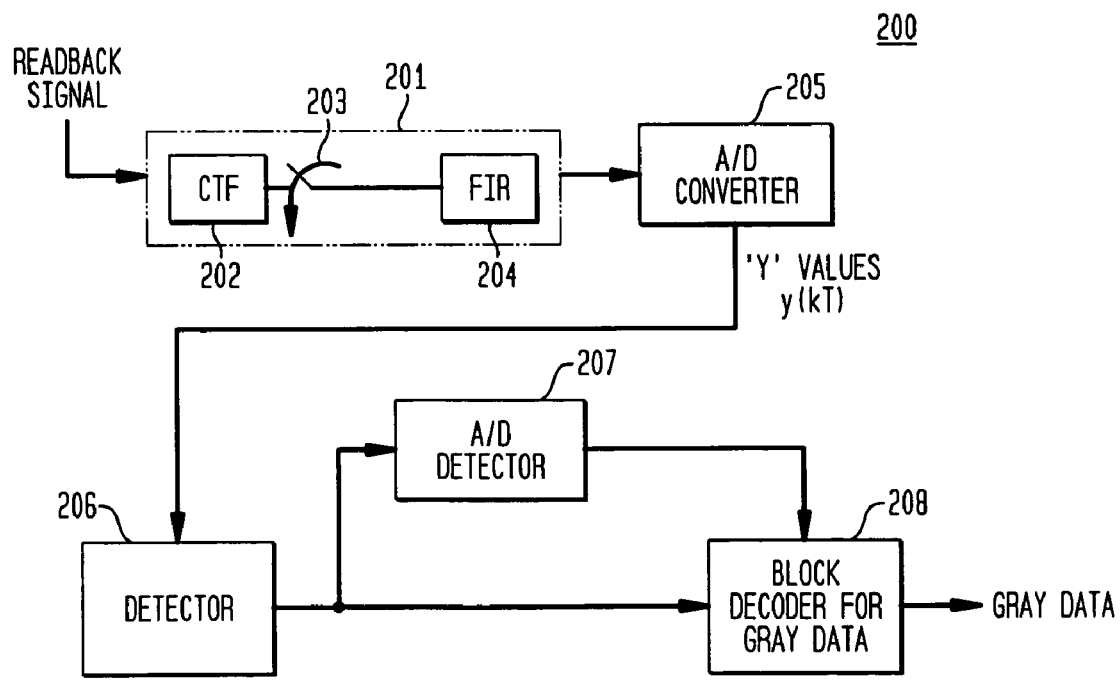
FIG. 2 shows a receiver for detecting and decoding servo information in accordance with an exemplary embodiment of the present invention.

FIG. 2 shows receiver 200 for detecting and decoding servo information in accordance with an exemplary embodiment of the present invention. Receiver 200 comprises equalizer 201, which adaptively adjusts the channel response of an input signal read from, for example, a magnetic recording medium to a desired target partial response. Equalizer 201 comprises continuous time filter (CTF) 202, switch 203, and finite impulse response (FIR) filter 204. After initial filtering of the input analog signal by CTF 202, equalizer 201 samples the signal with period T, where T is the ideal symbol rate, using switch 203. FIR filter 204 is characterized by a certain number of tap values, or weights, (e.g., 10 tap values). Equalization of the input signal by equalizer 201 varies with i) the cut-off frequency and the zero frequency of CTF 203 and ii), for some applications, adaptive modification of the tap weights of FIR filter 204.

The output signal of FIR filter 204 is quantized into digital samples y(kT) by A/D converter (ADC) 205. Since timing of the digital samples y(kT) corresponds to the symbol rate, each of the digital samples y(kT) corresponds to a symbol value degraded by, for example, noise or other channel effects.

Servo decoder 200 further comprises detector 206 (which might be implemented as either a threshold or Viterbi detector), servo address mark (SAM) detector 207, and block decoder 208 for decoding of encoded Gray data. Operation of equalizer 201, ADC 205, detector 206, and block decoder 208 processing the detected blocks of servo data is well-known in the art.

Servo data of the readback signal comprises a preamble, servo address mark (SAM) and Gray data, burst demod data, and RRO data, which are encoded using, for example, a run-length limited code to generate blocks of symbols recorded to and read from the medium. For certain embodiments of the present invention described herein, servo data is encoded with a wide biphase code and servo decoder 200 employs a threshold detector for detecting the servo data. Such methods are known in the art and described in, for example, Bergmans et al., "Analysis of a biphase-based servo format for hard disk drives," IEEE Transactions on Magnetics, Vol. 36, Issue 6, pp 4019-4027, November 2000, the teachings of which are included herein by reference.

For exemplary servo data, a 2T preamble pattern of "001100110011 . . . " is followed by SAM and Gray data that are both encoded with a wide biphase code. For an exemplary wide biphase code, a servo encoder encodes a servo data value of "1" to codeword "0 0 1 1" and a servo data value of "0" to codeword "1 1 0 0". The readback waveform from the recording medium for such a wide biphase encoded signal exhibits a relatively large positive peak (corresponding to servo data "1") or a relatively large negative peak (corresponding to servo data "0") at the codeword boundary.

For an L-bit wide, biphase-coded SAM within the readback signal, L a positive integer, [s(1) s(2) s(3) . . . s(L)] denotes the L-bit pattern representing the SAM, where s(.) is either a "0" or a "1". Since the wide biphase code encodes a "0" to "1100" and a "1" to "0011", the preamble pattern is "001100110011 . . . ". Although the preamble pattern is not normally decoded, a wide biphase decoder might decode this sequence into a sequence of all "1"s (i.e., the preamble also represents an encoded "1"s pattern). If a threshold detector is employed for detector 206, the wide biphase coded data of the readback signal exhibits either a positive peak or a negative peak at the codeword boundary (every 4T) after equalization to the target partial response. Thus, by having a threshold of zero at the codeword boundary, if the received sample is greater than the threshold (i.e., sample is positive) then the data bit is detected and decoded as a "1"; otherwise, the data bit is detected and decoded as a "0". If the threshold detector is employed for detection during the preamble field, then the detector output is an all ones pattern.

Figure 3:
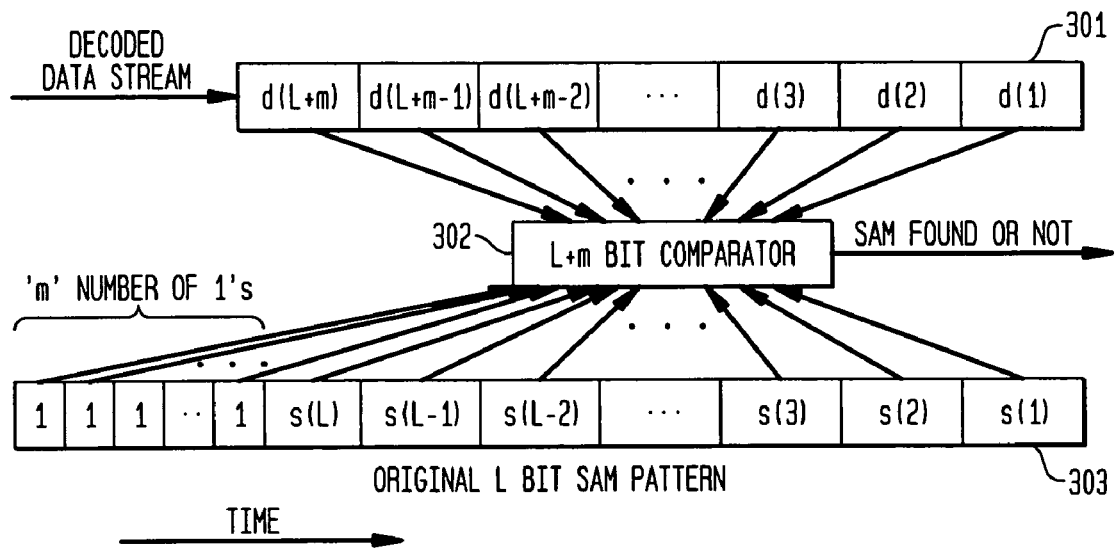
FIG. 3 shows a servo address mark (SAM) detector operating in accordance with a first exemplary embodiment of the present invention.

FIG. 3 shows SAM detector 300 operating in accordance with a first exemplary embodiment of the present invention and that might be employed for detector 207 of FIG. 2. In accordance with the first exemplary embodiment, the false SAM rate might be improved without increasing the number of bits (L) used for SAM detection. SAM detector 300 comprises (L+m)-bit shift register 301, (L+m)-bit comparator 302, and register 303 (m is a positive integer). SAM detector 300 compares, using (L+m)-bit comparator 302, (L+m) detected bits in (L+m)-bit shift register 301 to an (L+m)-bit SAM pattern, instead of an L-bit SAM pattern, stored in register 303.

To save format space on the recording medium, the L-bit SAM is written to the medium but SAM detector 300 examines the (L+m)-bit SAM pattern comprising the L-bit SAM pattern and the previous m bits of the servo preamble (m 1's). Thus, even though an L-bit SAM is written to the recording medium, SAM detector 300 detects an (L+m)-bit SAM pattern. The false SAM rate might decrease because the L-bit SAM is processed as an (L+m)-bit pattern.

Figure 4:
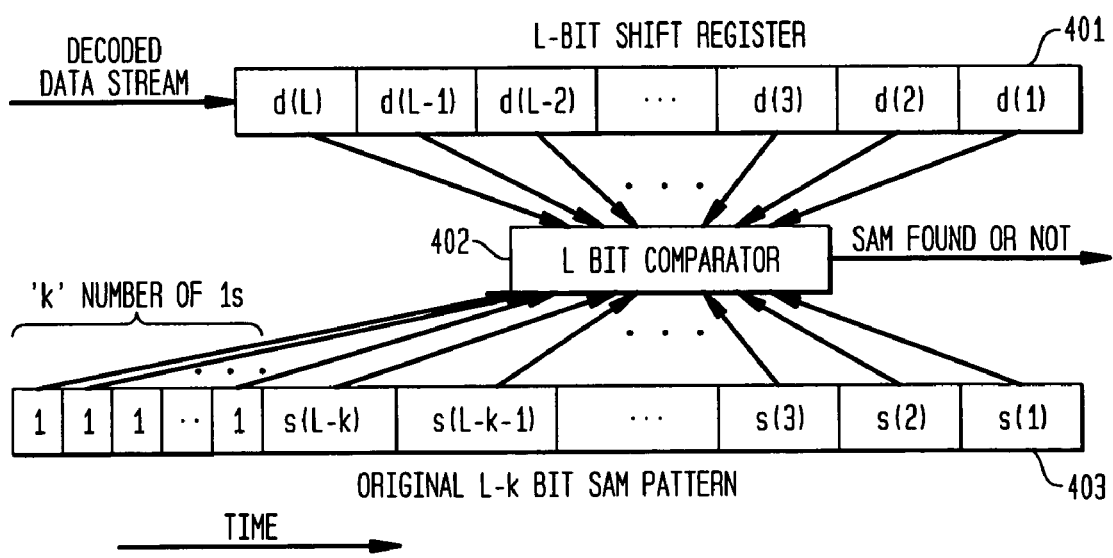
FIG. 4 shows a servo address mark (SAM) detector operating in accordance with a second exemplary embodiment of the present invention.

FIG. 4 shows a servo address mark (SAM) detector operating in accordance with a second exemplary embodiment of the present invention and might be employed for detector 207 of FIG. 2. In accordance with the second exemplary embodiment, the false SAM rate might be improved when fewer than L bits (L−k bits, where k is less than L) are employed for the SAM. SAM detector 400 comprises L-bit shift register 401, L-bit comparator 402, and register 403. SAM detector 400 compares, using L-bit comparator 402, L-detected-bits in L-bit shift register 301 to an L-bit SAM pattern, instead of an (L−k)-bit SAM pattern. Since the SAM is preceded by the all 1's servo preamble pattern, an L-bit SAM pattern is formed from the (L−k)-bit SAM by preceding the (L−k)-bit pattern with k bits from the preamble. L-bit comparator 402 searches for this L-bit pattern in the detected bit stream to declare the SAM found. The second exemplary embodiment might be employed when the SAM detector uses existing L-bit shift register circuitry for detecting an (L−k)-bit SAM, while also improving the false SAM rate by detecting a longer SAM bit-pattern that is effectively larger than the original (L−k)-bit SAM.

A read channel of a recording system operating in accordance with one or more embodiments of the present invention may exhibit the following advantages. Given, for example, a SAM of L bits, the false SAM rate might be improved without any increase in format overhead. Also, if fewer than L bits are employed for the SAM, existing circuitry for detecting the L-bit SAM pattern might be employed while also improving the false SAM rate for the SAM having fewer than L bits.

While the present invention is described for exemplary embodiments for servo address mark detection, the present invention is not so limited. The present invention might be employed for read address mark detection, or extended to other encoded fields in a readback signal where the field is preceded by a known preamble pattern.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of detecting the presence of field data in a readback signal, the method comprising the steps of:
   (a) detecting N bits from the readback signal, N an integer;
   (b) comparing the N detected bits with a predefined pattern, wherein the predefined pattern comprises the field data augmented by one or more bits of a preamble adjacent to the field data;
   (c) declaring, when the N bits match the predefined pattern, the field data to be present; and
   (d) decoding a subsequent field of the readback signal when the field data is present.

2. The invention as recited in claim 1, further comprising the step of (d) repeating, if the N bits do not match the predefined pattern, steps (a), (b), and (c) for each subsequent detected bit from the readback signal.

3. The invention as recited in claim 1, for step (b), the field data is an address mark.

4. The invention as recited in claim 3, wherein, for step (b), the preamble is either an all ones or an all zeros pattern.

5. The invention as recited in claim 3, wherein, for step (a), the preamble and the field data of the readback signal is encoded with a wide biphase code.

6. The invention as recited in claim 3, wherein, for step (b), the address mark is either a servo address mark or a read address mark.

7. The invention as recited in claim 1, wherein the subsequent field is gray data.

8. The invention as recited in claim 1, wherein, for step (b), the one or more bits of the preamble are decoded bits.

9. An apparatus for detecting the presence of field data in a readback signal, the apparatus comprising:
   a register adapted to store N detected bits from the readback signal, N an integer;
   a comparator adapted to compare the N detected bits with a predefined pattern, wherein the predefined pattern comprises the field data augmented by one or more bits of a preamble adjacent to the field data, wherein, when the N bits match the predefined pattern, the comparator declares the field data to be present; and
   a decoder adapted to decode a subsequent field of the readback signal when the field data is present.

10. The invention as recited in claim 9, wherein, if the N bits do not match the predefined pattern, the register is further adapted to shift each subsequent detected bit from the readback signal into the register.

11. The invention as recited in claim 9, wherein the field data is an address mark.

12. The invention as recited in claim 11, wherein the preamble is either an all ones or an all zeros pattern.

13. The invention as recited in claim 11, wherein the preamble and the field data of the readback signal is encoded with a wide biphase code.

14. The invention as recited in claim 11, wherein the address mark is either a servo address mark or a read address mark.

15. The invention as recited in claim 9, wherein the subsequent field is gray data.

16. The invention as recited in claim 9, wherein the one or more bits of the preamble are decoded bits.

17. The invention as recited in claim 16, wherein the length of the field data is L, L a positive integer, and the one or more bits of the preamble is m bits, m a positive integer, and N is L+m.

18. The invention as recited in claim 16, wherein the length of the field data is L−k, L a positive integer, and the one or more bits of the preamble is k bits, k a positive integer, and N is L.

19. The invention as recited in claim 9, wherein the apparatus is embodied in an integrated circuit (IC).

20. The invention as recited in claim 19, wherein the IC is implemented as a component of either a magnetic recording system or an optical recording system.

21. An apparatus for detecting the presence of field data in a readback signal, the apparatus comprising:
   a register adapted to store N detected bits from the readback signal, N an integer;
   a comparator adapted to compare the N detected bits with a predefined pattern, wherein the predefined pattern comprises the field data augmented by one or more bits of a preamble adjacent to the field data,
   wherein:
      when the N bits match the predefined pattern, the comparator declares the field data to be present;
      the length of the field data is L, L a positive integer;
      the one or more bits of the preamble is m bits, m a positive integer, and
      N is L+m.

22. The invention as recited in claim 21, wherein the one or more bits of the preamble are decoded bits.

23. An apparatus for detecting the presence of field data in a readback signal, the apparatus comprising:
   a register adapted to store N detected bits from the readback signal, N an integer;
   a comparator adapted to compare the N detected bits with a predefined pattern, wherein the predefined pattern comprises the field data augmented by one or more bits of a preamble adjacent to the field data,
   wherein:
      when the N bits match the predefined pattern, the comparator declares the field data to be present;
      the length of the field data is L−k, L a positive integer;
      the one or more bits of the preamble is k bits, k a positive integer; and
      N is L.

24. The invention as recited in claim 23, wherein the one or more bits of the preamble are decoded bits.

* * * * *